US010209971B2

(12) United States Patent
Baskaran et al.

(10) Patent No.: US 10,209,971 B2
(45) Date of Patent: Feb. 19, 2019

(54) SYSTEMS AND METHODS FOR APPROXIMATION BASED OPTIMIZATION OF DATA PROCESSORS

(71) Applicant: Reservoir Labs, Inc., New York, NY (US)

(72) Inventors: Muthu M. Baskaran, Bayonne, NJ (US); Thomas Henretty, Brooklyn, NY (US); Ann Johnson, Saratoga, CA (US); Athanasios Konstantinidis, Brooklyn, NY (US); M. H. Langston, New Windsor, NY (US); Richard A. Lethin, New York, NY (US); Janice O. McMahon, Bethesda, MD (US); Benoit J. Meister, New York, NY (US); Paul Mountcastle, Moorestown, NJ (US)

(73) Assignee: Reservoir Labs, Inc., New York, NY (US)

( * ) Notice: Subject to any disclaimer, the term of this patent is extended or adjusted under 35 U.S.C. 154(b) by 211 days.

(21) Appl. No.: 14/699,854

(22) Filed: Apr. 29, 2015

(65) Prior Publication Data
US 2015/0309778 A1    Oct. 29, 2015

Related U.S. Application Data

(60) Provisional application No. 61/985,775, filed on Apr. 29, 2014.

(51) Int. Cl.
G06F 9/45    (2006.01)
G06F 9/44    (2018.01)
G06F 8/41    (2018.01)

(52) U.S. Cl.
CPC .................. *G06F 8/4441* (2013.01)

(58) Field of Classification Search
None
See application file for complete search history.

(56) References Cited

U.S. PATENT DOCUMENTS

2008/0250401 A1* 10/2008 Puri ..................... G06F 8/433
717/160

OTHER PUBLICATIONS

Benson et al., "GPU-Based Space-Time Adaptive Processing (STAP) for Radar," HPEC, pp. 1-6 (2013).
(Continued)

*Primary Examiner* — Chuck O Kendall
(74) *Attorney, Agent, or Firm* — Goodwin Procter LLP

(57) ABSTRACT

A compilation system can apply a smoothness constraint to the arguments of a compute-bound function invoked in a software program, to ensure that the value(s) of one or more function arguments are within specified respective threshold(s) from selected nominal value(s). If the constraint is satisfied, the function invocation is replaced with an approximation thereof. The smoothness constraint may be determined for a range of value(s) of function argument(s) so as to determine a neighborhood within which the function can be replaced with an approximation thereof. The replacement of the function with an approximation thereof can facilitate simultaneous optimization of computation accuracy, performance, and energy/power consumption.

40 Claims, 8 Drawing Sheets

```
1   /* L2 norm. */
2   void norm(double * n, double x, double y, double z) {
3       *n = sqrt(x*x+y*y+z*z);
4   }
5
6   // Approximation of a L2 norm(x,y,z) assuming a constant.
7   #pragma rstream approx_of:norm
8   void norm_apx_2d(double *n, double x, double y, double z,
9                    double norm0, double x0, double y0,
10                  double z0) {
11      double finv =1.0/norm0;
12      double dx = x-x0;
13      double dy = y-y0;
14      double a = x0*finv;
15      double b = y0*finv;
16      double A = dx*a;
17      double B = dy*b;
18      *n = norm0 + A + B + ((dx*dx*(1.0-a*a)
19                  + dy*dy*(1.0-b*b))*0.5 - A*B)*finv;
20  }
```

(56) References Cited

OTHER PUBLICATIONS

Click, Cliff, "Global Code Motion: Global Value Numbering," In Proceedings of the ACM SIGPLAN 1995 Conference on Programming Language Design and Implementation, La Jolla, California (pp. 246-257) Jun. 1995.
Park et al., "Efficient Backprojection-Based Synthetic Aperture Radar Computation with Many-Core Processors," In Proccedings of Supercomputing '12 (Nov. 2012).
Shaw et al., "Anton, a Special-Purpose Machine for Molecular Dynamics Simulation," ISCA, pp. 1-12, (2007).
Stephenson et al., "Bitwidth Analysis with Application to Silicon Compilation," Massachusetts Institute of Technology: Laboratory for Computer Science, pp. 108-120 (2000).

* cited by examiner

```
1  // before OSR
2  for (int i=0; i<= n; i++) {
3      a = pow(x, i);
4  }
5
6  // after OSR
7  a_0 = pow(x,0);
8  for (int i=1; i<= n; i++) {
9      a = a_0 * x;
10     a_0 = a;
11 }
```

FIG. 1

```
1  for (int i=0; i< N; i++) {
2      a = ...;
3      b = ...;
4      ... = f(a, b, c);
5  }
```

FIG. 2

```
1  for (int i=0; i< N; i++) {
2      int exact = (i % TI ==0);
3      if (!exact) {
4          a_0 = a;
5          b_0 = b;
6      }
7      a = ...;
8      b = ...;
9      if (exact) {
10         f_0 = f(a,b);
11     } else {
12         f_0 = df(f_0, a_0, b_0, a, b);
13     }
14     ... = f_0;
15 }
```

FIG. 3

```
1   /* L2 norm. */
2   void norm(double * n, double x, double y, double z) {
3       *n = sqrt(x*x+y*y+z*z);
4   }
5
6   // Approximation of a L2 norm(x,y,z) assuming z constant.
7   #pragma rstream approx_of:norm
8   void norm_apx_2d(double *n, double x, double y, double z,
9                    double norm0, double x0, double y0,
10          double z0) {
11      double finv =1.0/norm0;
12      double dx = x-x0;
13      double dy = y-y0;
14      double a = x0*finv;
15      double b = y0*finv;
16      double A = dx*a;
17      double B = dy*b;
18      *n = norm0 + A + B + ((dx*dx*(1.0-a*a)
19              + dy*dy*(1.0-b*b))*0.5 - A*B)*finv;
20  }
```

FIG. 6

Table 1: SNRs for a 1024 x 1024 image, as a function of tile sizes

| Tile sizes | SNR |
|---|---|
| 64 × 64 | 66.01 |
| 32 × 32 | 89.23 |
| 32 × 16 | 100.32 |
| 16 × 16 | 113.74 |

FIG. 7

```
1  void adaptive_norm_apx_2d(double *n, double x, double y,
2                            double z, double norm0, double x0,
3                            double y0, double z0) {
4    double finv, a, b, A, B;
5    double dx = x-x0;
6    double dy = y-y0;
7    if (dx>=TAU_2D || dx<=-TAU_2D ||
8        dy>=TAU_2D || dy<=-TAU_2D) {
9      norm(n, x, y, z);
10     return;
11   }
12   finv = 1.0/norm0;
13   a = x0*finv;
14   b = y0*finv;
15   A = dx*a;
16   B = dy*b;
17   *n = norm0 + A + B
18        + ((dx*dx*(1.0-a*a) +
19            dy*dy*(1.0-b*b))*0.5 - A*B)*finv;
20 }
```

FIG. 8

Table 2: Percentage of precise computations as a function of the input difference threshold in adaptive_norm_apx_2d

| Image size | TAU_2D | SNR | % precise computations |
|---|---|---|---|
| 512 × 512 | 2.0 | 137.47 | 21.36 |
| 512 × 512 | 3.0 | 128.03 | 22.0 |
| 512 × 512 | 4.0 | 100.50 | 17.4 |
| 1024 × 1024 | 2.0 | 131.83 | 12.66 |
| 1024 × 1024 | 3.0 | 116.46 | 11.2 |
| 1024 × 1024 | 4.0 | 95.70 | 10.7 |
| 2048 × 2048 | 2.0 | 136.61 | 11.7 |
| 2048 × 2048 | 3.0 | 128.87 | 11.3 |
| 2048 × 2048 | 4.0 | 113.18 | 9.67 |

FIG. 9

Table 3: Percentage of precise computations as a function of the tile size for a 1024 x 1024 image

| Tile size | TAU_2D | SNR | % precise comp. |
|---|---|---|---|
| 16 × 16 | 4.0 | 113.74 | 0 |
| 32 × 16 | 4.0 | 101.02 | 2.62 |
| 32 × 32 | 4.0 | 92.04 | 3.64 |
| 64 × 64 | 4.0 | 95.70 | 10.7 |
| 128 × 128 | 4.0 | 99.08 | 19.9 |
| 256 × 256 | 4.0 | 138.37 | 36.6 |
| 256 × 256 | 8.0 | 103.00 | 35.2 |

FIG. 10

```
1  void adaptive_sqrt_apx2(double *s, double arg,
2                          double s0, double arg0) {
3      // 1/(2f), i.e., 1/(2sqrt(s0))
4      double a;
5      double finv;
6      const double dx  = arg - arg0;
7      if (dx <= -TAU_S2 || dx >= TAU_S2) {
8          r_sqrt(s, arg);
9          return;
10     }
11     finv = 0.5/s0;
12     a    = finv * dx; // dx/(2f)
13     // sqrt(x+dx) ~= s0 + dx/(2f)(1 - dx/(4f^2))
14     *s = s0 + a*(1.0 - a*finv);
15 }
```

FIG. 11

Table 4: SNR and percentage of precise computations as a function of tile sizes and precision domain for adaptive and non-adaptive square root

| SNR / % precise comp. | TAU_S2= 10000 | TAU_S2 = 50000 | TAU_S2=+ inf |
|---|---|---|---|
| 16 × 16 × 16 | 138.32 / 7.86 | 121.29 / 0.00 | 121.29 / 0.00 |
| 32 × 32 × 32 | 138.59 / 9.12 | 104.55 / 5.45 | 103.78 / 0.00 |
| 64 × 64 × 64 | 138.91 / 10.18 | 97.5 / 6.81 | 77.61 / 0.00 |
| 128 × 128 × 128 | 138.86 / 20.14 | 103.74 / 16.71 | 79.84 / 0.00 |

FIG. 12

Table 5: Percentage of precise argument reductions in adaptive sincos as a function of the tile size

| Tile size | SNR / % precise arg reductions. |
|---|---|
| 16 × 16 × 16 | 94.30 / 11.07 |
| 32 × 32 × 32 | 94.24 / 11.79 |
| 64 × 64 × 64 | 94.24 / 12.06 |
| 128 × 128 × 128 | 94.25 / 20.65 |

FIG. 13

```
1   // res_sin_pol is a polynomial approximation of sin(x)
2   void sincos2pi_res_adapt_apx(float * sine, float * cosine,
3                                double arg,
4                                           float sine0, float cosine0,
5                                double arg0) {
6       double x2;
7       double darg = arg-arg0;
8       if (darg >=-1 && darg <= 1.0) {
9           float dcosine;
10          float dsine;
11          if (darg < 0) { darg += 1.0; }
12          darg = M_PI - darg*2*M_PI;
13          dsine   = res_sin_pol(darg);
14          x2 = darg + 1.5*M_PI;
15          if (x2 > M_PI) {x2 -= 2*M_PI;}
16          dcosine = res_sin_pol(x2);
17          *sine   = sine0*dcosine   + cosine0*dsine;
18          *cosine = cosine0*dcosine - sine0*dsine;
19      } else {
20          const int arg_floor  = (long int) arg;
21          const double frac    = arg - (double) arg_floor;
22          const double xx      = M_PI - frac*2*M_PI;
23          nb_precise++;
24          *sine = res_sin_pol(xx);
25          x2 = xx + 1.5*M_PI;
26          if (x2 >= M_PI) { x2 -= 2*M_PI; }
27          *cosine = res_sin_pol(x2);
28      }
29  }
```

FIG. 14

Table 6: SNR as a function of precision parameters for the 2-D norm and sine/cosine

| SNR | Degree 4 | Degree 5 | Degree 5 |
|---|---|---|---|
| TAU_2D= 2.0 | 67.93 | 94.38 | 120 |
| TAU_2D= 3.0 | 67.93 | 94.37 | 119.25 |
| TAU_2D= 4.0 | 67.93 | 94.33 | 113.54 |

SYSTEMS AND METHODS FOR APPROXIMATION BASED OPTIMIZATION OF DATA PROCESSORS

CROSS-REFERENCE TO RELATED APPLICATIONS

This application claims priority to and benefit of U.S. Provisional Patent Application No. 61/985,775, entitled "Adaptive Approximate Strength Reduction," that was filed on Apr. 29, 2014, the entire contents of which are incorporated herein by reference.

FIELD OF THE INVENTION

This disclosure generally relates to compilation systems for optimizing the execution of programs on various data processing hardware platforms and, in particular, to systems for optimizing number and/or type of computations on such platforms.

BACKGROUND

Trading precision for performance is a recognized opportunity for optimization of computing systems. For example, in the reconfigurable computing field, techniques were developed to optimize bit width to save gates in a field programmable gate array (FPGA) computing applications. These techniques, however, are generally directed to finding the minimum number of bits that could fit the range of values for variables rather than approximating the computations of functions/procedures.

Approximation based optimization (ABO) is generally directed to optimizations that can explore precision-performance tradeoffs by using approximations of computationally intensive functions/procedures. ABO can be considered to be a generalization of the classical compiler optimization called "strength reduction" which, in particular, can be beneficial in loop codes, e.g., by transforming expensive multiply operations into recurrences of additions. Generally in ABO, implementation of expensive computations such as transcendental function evaluation is replaced with approximations that take much less work to compute. As such, the overall execution of a program in which the execution of one or more functions/procedures is replaced with corresponding approximation(s) can be improved, e.g., in terms of execution time, number of computations, etc. ABO can be useful in many computationally intensive applications including signal processing associated with synthetic aperture radars (SARs), image processing, processing of cellular communication signals, speech signals, etc.

ABO in Compute-Bound Programs

Many compute-bound (also called computationally intensive) programs spend a significant portion of their cycles in standard numerical library functions (e.g., square root, trigonometric, etc.) applied to values that change at every loop iteration. If the function arguments are contiguous in the iteration domain, and if the variation of the arguments is small enough from one iteration to the next, it is possible to replace a series of expensive-but-precise computations based on numerical library calls with one expensive-but-precise computation followed by a series of inexpensive-but-imprecise computations of the neighboring values. At some point, the accumulated error from the imprecise computations becomes unacceptable, in which case a precise computation is needed.

Such a replacement of precise functions/procedures with relatively imprecise functions/procedures in compute-bound programs in general, however, can introduce computation errors which, in some instances, can be unacceptable, i.e., these errors can cause the program to produce erroneous results. Moreover, in some instances an ad hoc replacement of an exact procedure/function with a corresponding approximation, such as a replacement specified by a programmer, can adversely affect optimization of the program. For example, the use of an approximation can affect loop tiling, which can limit the benefits of optimizing memory locality, data transfers between main memory and cache memory, and/or parallelized execution of the program.

SUMMARY

In various embodiments, systems and methods described herein allow for automating transformations and reasoning to reduce the number of computations (the operation counts, in general) in any computation-bound programs (e.g., Intelligence Surveillance Reconnaissance (ISR) kernels, SAR applications, image processing, etc.). These transformations generally include trading approximate computations (also called approximations) for accuracy, while simultaneously allowing for optimizations in other performance related dimensions. For example, some transformations include trading approximation for more parallelism, reduced number of computations, reduced complexity computation, and/or reduced communication, one or more of which can decrease the execution time. In various embodiments, the compiler systems described herein can also exploit tradeoffs between approximation, execution time, energy, and power. Therefore, codes that help the programmer manage these tradeoffs can be generated using various embodiments of the compiler system described herein.

This is achieved, at least in part, by reducing the operation count of programs (such as the number of operations related to numerical library functions) by approximating the evolution of the function over a bounded domain. The size of the bounded domain (e.g., a tile size) is selected such that variation of one or more function arguments within the bounded domain is smooth, i.e., the variation is less than a specified threshold. This can enable the application of other optimizations, such memory locality improvement, parallelization, etc., to be applied to the bounded domain, while ensuring that the cost of reduced numerical precision, i.e., the error introduced in the computation results, is tolerable. Techniques that approximate the evolution of a function in a bounded neighborhood may also be applied to enforce the guarantees dynamically, e.g., when assumptions that guarantee a given amount of precision cannot be guaranteed statically. This allows the size of the bounded domain to be independent of the computation error introduced by reduced precision, which may allow effective application of other performance related optimizations. These neighboring-based approximations can be automatically generated by various embodiments of a compiler once the programmer has defined the approximation to the compiler.

Accordingly, in one aspect a method is provided for optimizing performance of a processing system. The method steps include tiling a loop nest, where the loop nest includes at least one loop. Each tile includes a specified computation based on an argument, and a value of the argument varies as the tile index varies. A tile size is selected such that a difference between a value of the argument corresponding to a final tile index and a value of the argument corresponding to an initial tile index does not exceed a threshold, so as to ensure smoothness of the argument across the tile. The method also includes the steps of employing an exact procedure implementing the specified computation for the initial tile index, and employing an approximate procedure implementing the specified computation for each subsequent tile index. A computation cost according to a cost metric of the approximate procedure is less than a computation cost according to that cost metric of the exact procedure.

The specified computation may be based on a first set of arguments including a second set/subset of arguments, and respective values of the second set of arguments may vary as the tile index varies. The tile size may be selected such that respective differences between respective values of the second set of arguments corresponding to the final tile index and respective values of the second set of argument corresponding to the initial tile index do not exceed respective thresholds. The threshold or the respective thresholds may based on, at least in part, an error associated with the approximate procedure. The cost metric may include a number of computations and/or type(s) of one or more computation(s).

In some embodiments, an approximate result is computed for a first subsequent index is based on, in part, an exact result obtained from the exact procedure, and respective approximate results computed for other subsequent indices are based on, in part, respective approximate results obtained from the approximate procedure for respective previous indices. In some embodiments, each approximate result computed for each one of the subsequent indices is based on, in part, an exact result obtained from the exact procedure. The method may further include parallelizing the tiled loop nest.

In some embodiments, for each one of a first set of subsequent indices a corresponding approximate result is computed based on, in part, an exact result obtained from the exact procedure. In these embodiments, for each one of a second set of subsequent indices a corresponding approximate result is computed based on, in part, an approximate result corresponding to a respective tile index from the first set of subsequent indices. The method may further include parallelizing computation of approximate results corresponding to the first set of indices.

In another aspect, a method for optimizing performance of a processing system includes the following steps. In a tiled a loop nest that includes at least one loop and where each tile includes a specified computation based on a first argument, such that a value of the first argument varies as a tile index varies, employing an exact procedure implementing the specified computation for a reference tile index. Determining if a first difference between values of the first argument corresponding to a first non-reference tile index and corresponding to the reference index is greater than a first threshold. In addition, if the first difference is not greater than the first threshold, employing an approximate procedure implementing the specified computation for the first non-reference tile index and, otherwise, employing the exact procedure for the first non-reference tile index. A computation cost according to a cost metric of the approximate procedure is less than a computation cost according to that cost metric of the exact procedure.

The approximate procedure may depend, in part, on the determined first difference between values of the first argument corresponding to the first non-reference tile index and corresponding to the reference index. The specified computation may further be based on a second argument, a value of the second argument also varying as the tile index does, and the method may further include determining if a second difference between values of the second argument corresponding to the first non-reference tile index and corresponding to the reference index is greater than a second threshold. The method may also include employing the approximate procedure for the first non-reference tile index, if both the first and second differences are not greater than the first and second thresholds, respectively and, otherwise, employing the exact procedure for the first non-reference tile index.

In some embodiments, the second threshold is equal to the first threshold, while in other embodiments the two thresholds are different. The first threshold may be based on, at least in part, an error associated with the approximate procedure. The cost metric may include a number of computations and/or type(s) of computation(s). In some embodiments, the method further includes modifying the reference index by setting the first non-reference tile index as the new reference index, if the exact procedure is employed for the first non-reference tile index.

In some embodiments, the method further includes employing the approximate procedure implementing the specified computation for a second non-reference tile index. The approximate procedure may depend on, in part, either: (i) an exact result obtained from the exact procedure, or (ii) an approximate result obtained from the approximate procedure employed for the first non-reference tile index. The method may further include employing the approximate procedure implementing the specified computation for a third non-reference tile index. The approximate procedure may depend on, in part, either: (i) an exact result obtained from the exact procedure, or (ii) an approximate result obtained from the approximate procedure employed for the second non-reference tile index.

In some embodiments, the method further includes tiling a loop nest to generate the tiled loop nest. A tile size may be selected such that a difference between a value of the argument corresponding to a final tile index and a value of the argument corresponding to an initial tile index does not exceed a threshold. The method may include parallelizing the tiled loop nest.

In another aspect, a compilation system for optimizing performance of a processing system includes a first processor and a first memory in electrical communication with the first processor. The first memory includes instructions which, when executed by a processing unit that may include the first processor and/or a second processor and that is coupled to a memory module include either the first memory or a second memory, or both, program the processing unit to tile a loop nest, where the loop nest includes at least one loop. Each tile includes a specified computation based on an argument, and a value of the argument varies as the tile index varies. The processing unit is programmed to select a tile size such that a difference between a value of the argument corresponding to a final tile index and a value of the argument corresponding to an initial tile index does not exceed a threshold, so as to ensure smoothness of the argument across the tile.

In addition, the processing unit is programmed to employ an exact procedure implementing the specified computation for the initial tile index, and to employ an approximate procedure implementing the specified computation for each subsequent tile index. A computation cost according to a cost metric of the approximate procedure is less than a computation cost according to that cost metric of the exact procedure. In various embodiments, the instructions can program the processing unit to perform one or more of the method steps described above.

In another aspect, a compilation system for optimizing performance of a processing system includes a first processor and a first memory in electrical communication with the first processor. The first memory includes instructions which, when executed by a processing unit that may include the first processor and/or a second processor and that is coupled to a memory module include either the first memory or a second memory, or both, program the processing unit to employ an exact procedure implementing a specified computation for a reference tile index of a tile in a tiled a loop nest. The tiled loop nest includes at least one loop and each tile includes the specified computation that is based on a first argument, such that a value of the first argument varies as the tile index varies.

The processing unit is also programmed to determine if a first difference between values of the first argument corresponding to a first non-reference tile index and corresponding to the reference index is greater than a first threshold. In addition, the processing unit is programmed, if the first difference is not greater than the first threshold, to employ an approximate procedure implementing the specified computation for the first non-reference tile index and, otherwise, to employing the exact procedure for the first non-reference tile index. A computation cost according to a cost metric of the approximate procedure is less than a computation cost according to that cost metric of the exact procedure. In various embodiments, the instructions can program the processing unit to perform one or more of the method steps described above.

In another aspect, an article of manufacture that includes a non-transitory storage medium has stored therein instructions which, when executed by a processing unit program the processing unit, which is in electronic communication with a memory module, to tile a loop nest, where the loop nest includes at least one loop. Each tile includes a specified computation based on an argument, and a value of the argument varies as the tile index varies. The processing unit is programmed to select a tile size such that a difference between a value of the argument corresponding to a final tile index and a value of the argument corresponding to an initial tile index does not exceed a threshold, so as to ensure smoothness of the argument across the tile.

In addition, the processing unit is programmed to employ an exact procedure implementing the specified computation for the initial tile index, and to employ an approximate procedure implementing the specified computation for each subsequent tile index. A computation cost according to a cost metric of the approximate procedure is less than a computation cost according to that cost metric of the exact procedure. In various embodiments, the instructions can program the processing unit to perform one or more of the method steps described above.

In another aspect, an article of manufacture that includes a non-transitory storage medium has stored therein instructions which, when executed by a processing unit program the processing unit, which is in electronic communication with a memory module, to employ an exact procedure implementing a specified computation for a reference tile index of a tile in a tiled a loop nest. The tiled loop nest includes at least one loop and each tile includes the specified computation that is based on a first argument, such that a value of the first argument varies as the tile index varies.

The processing unit is also programmed to determine if a first difference between values of the first argument corresponding to a first non-reference tile index and corresponding to the reference index is greater than a first threshold. In addition, the processing unit is programmed, if the first difference is not greater than the first threshold, to employ an approximate procedure implementing the specified computation for the first non-reference tile index and, otherwise, to employing the exact procedure for the first non-reference tile index. A computation cost according to a cost metric of the approximate procedure is less than a computation cost according to that cost metric of the exact procedure. In various embodiments, the instructions can program the processing unit to perform one or more of the method steps described above.

While execution time is determined in general by the slowest, highest-latency features of a program, energy is defined by the sum of the energies consumed by all parts of the program. Performance, therefore, is still important to many applications such as those that are subject to real-time constraints, and from minimizing energy/power consumption, as well, because static power leakage generally increases with execution time. Therefore, the techniques described herein are generally applicable to improving performance and/or to reducing the energy consumption of any code including loops for which a weak assumption of smoothness of function argument(s) over a bounded neighborhood holds.

BRIEF DESCRIPTION OF THE DRAWINGS

Various embodiments of the present invention taught herein are illustrated by way of example, and not by way of limitation, in the figures of the accompanying drawings, in which:

FIG. 1 depicts an example strength reduction;

FIG. 2 depicts an example of an approximatable function in a code segment;

FIG. 3 depicts an example of strict ABO, according to one embodiment;

FIG. 6 depicts an example of an approximatable norm function and the corresponding approximation;

FIG. 7 shows a table illustrating a relationship between tiles sizes and computation error expressed as signal to noise ratio (SNR), according to various embodiments;

FIG. 8 depicts an example of an approximatable two-dimensional norm function and the corresponding adaptive approximation, according to one embodiment;

FIG. 9 shows a table illustrating a relationship between percentage precise computations and a threshold used in adaptive ABO, according to one embodiment;

FIG. 10 shows a table illustrating a relationship between percentage precise computations and tile size, according to various embodiments;

FIG. 11 depicts an example of an adaptive approximation of a square root function, according to one embodiment;

FIG. 12 shows a table illustrating a relationship between percentage precise computations and tile size, according to embodiments implementing non-adaptive and adaptive ABO;

FIG. 13 shows a table illustrating a relationship between percentage precise computations and tile size for sincos function, according to various embodiments;

FIG. 14 depicts an example of an adaptive approximation of a sinecos function, according to one embodiment;

DETAILED DESCRIPTION

Figures 4, 5:
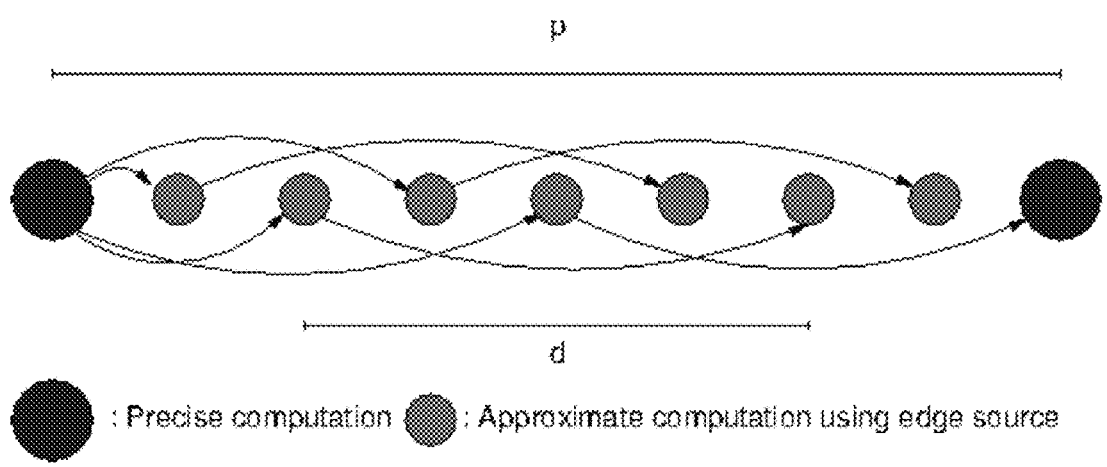
FIG. 4 depicts an example of relaxed ABO, according to one embodiment.
FIG. 5 schematically depicts mixed ABO, according to one embodiment.

A program compiled using various embodiments of compilation systems described herein can be executed using a data processor that may include one or more central processing units (CPUs), and one or memory banks, and/or one or more cache memories. Optionally, the data processor may also include specialized signal processing hardware, reconfigurable hardware, an/or vector execution units. The optimizations we describe here can be performed in various optimization phases in an optimizing compiler, e.g., a polyhedral model based compiler such as R-Stream™, that can tile loops in a way that creates the foundation for ABO.

In order to implement ABO, the user is generally required to provide a compilation system with an approximation function df for each function f that needs to be approximated. In various embodiments, the approximation function must depend upon: (i) a "base value" $f\_0$ of the function, i.e., a previously known value of the function, (ii) the value(s) $x\_0$ of its parameter(s) that were used to compute $f\_0$, and (iii) the value of parameter(s) for which we want to compute the approximation. In some embodiments, the approximation function may be modified to first compute the respective difference(s) between the value(s) of the parameter(s) and the corresponding initial value(s) of those parameter(s) that were used to compute $f\_0$.

Strict ABO.

A loop shown in FIG. 1, which computes successive integer powers of some variable x, can be strength-reduced to a series of multiplications, as also depicted in FIG. 1. Assuming a naive implementation of pow( ) function, this reduces the number of multiplies in the computation from $(n-1)n/2$ to n. Such strength reduction, however, cannot be implemented for all compute-bound functions because, in some situations, an error is introduced in the computation. An example code depicted in FIG. 2 includes several iterations of a function $f$, that has three arguments, namely, "a," "b," and "c." The values of the arguments "a" and "b" vary according to a loop index i. In general, a function to be approximated can have any number of arguments (e.g., 1, 2, 3, 5, 6, 8, 10, etc.). One or more, or all of these arguments may vary according to a loop index. One or more arguments may remain unchanged as the loop index changes.

Strict ABO (SABO) depicted in FIG. 3 can compute the value of a variable in an iteration of a loop as a function of the variable's previous value. With approximations, an additional constraint is that we can only afford a limited number of successive approximations. The listing in FIG. 3 illustrates how SABO can transform the example code shown in FIG. 2. The exact value is computed every TI iterations along i. The value of f is computed as a function of the previous value of f, the previous value of f s parameters and their current value. The value of TI, i.e., the number of iterations that can employ in approximation before an exact value must be computed for subsequent iterations, can be used to determine a tile size along the dimension i.

One advantage of SABO is that it can minimize the variation in the values of the parameter(s) to the approximation ($a-a_0$ and $b-b_0$ in this example). Given that approximation errors are typically polynomials of this variation, this also presumably keeps the error relatively low. The number of function arguments can be any number, e.g., (1, 2, 3, 5, 8, etc.)

Relaxed ABO

In relaxed ABO (RABO), the approximated value of the function is computed using the precise value of the computation and the current value of the function arguments. In our running example, using RABO, the value of f is not computed from the previous iteration's value of f, but directly from the value computed using the precise numerical library function, as depicted in FIG. 4.

One main advantage of RABO is that it provides more parallelism than SABO. More specifically, strict ABO introduces a dependence between consecutive iterations of the approximated computation. If the loops were doall parallel before applying SABO with n degrees of parallelism, they become parallel with (n−1) degrees. Since each iteration of a SABO'd loop nest depends upon its neighbors, a wavefront parallelization is always possible. However, exploiting such wavefront parallelism results in different data accesses, which may result in less efficient use of Single Instruction Multiple Data (SIMD) engines (which can be operated optimally when data is stored contiguously in memory). In RABO, the reference point for which the precise computation happens may be chosen anywhere in the tile if there is no loop-carried dependence across the computations off. Otherwise, the reference point computation must precede the iterations in the tile. In SABO, the reference point computation must always precede other iterations in the tile.

Mixed ABO

The decrease of parallelism that comes with SABO entails a loss of instruction-level parallelism optimization opportunities (including SIMD and pipeline parallelism) leading one to believe RABO is the optimal technique. The SABO and RABO, however, are not mutually exclusive techniques. A more sophisticated "mixed" ABO (MABO) is based on two sets of parameters (for each loop dimension), namely: (i) the distance p between precise computations (corresponding to the tile/block size in Park et al.), and (ii) the maximal distance d used by a relaxed approximate operation, as illustrated in FIG. 5. MABO can provide an additional fine-tuning dimension between performance and precision, in which some of the parallelism can be preserved. A minimal setting that would not compromise efficient SIM-Dization is d>s, where s is the considered SIMD width (the number of SIMD engines associated with a core).

In some embodiments, the RABO component of a compiler system (e.g., R-Stream™) requires the user define an approximation function matched with a relatively costly numerical function (which we'll call the "approximatable" function) to be approximated, as illustrated in FIG. 6. The compiler system's RABO optimization may take tiled code in which the approximatable function is called. It creates a precise instance of the function before each tile, and turns the tiled calls to the approximatable function into calls to the approximation described above.

In various embodiments, the approximation function has two sets of parameters. Each set corresponds to the parameters of the function to be approximated. The first set of parameters expects the normal parameters of the approximatable function. The second set expects the parameters (input and output) of the precise instance. In some implementations all input and output values to an approximatable function go through its parameters (as opposed to being returned by the function). Since important portions of the approximation are constant within a tile, the calls to the approximation function can be inlined, making the constant terms available for hoisting through global code motion (GCM).

In the discussion below, we refer to various compute-bound functions/procedures used in data processing related to SAR, and various implementations of the R-Stream™ compiler that can optimize the overall SAR data processing using approximations of these functions, for the sake of convenience. It should be understood that the various embodiments of ABO described herein can be included in and/or used with many different compilers that can target any computing system that may include one or more processors/central processing units (CPUs), one or more co-processors (such as match co-processor(s), application specific accelerator(s), etc.), one or more dedicated or shared cache memory modules, one or more memory banks, memory control(s), memory bus(ses), vector processor(s), etc. Present and future PERFECT architectures are only some examples of such computing systems. Various embodiments of ABO can be used to optimize the execution of any program that includes one or more compute-bound functions/procedures.

We used an embodiment of the R-Stream™ RABO component, along with the approximation described in FIG. 6 to automate our test of the assumption that the norm computation can be approximated as a two-degree polynomial. We produced a parallel version of SAR in which the platform position (p loop) is fixed for each (x, y) tile. We also fixed the (x, y) tile sizes, starting at 64×64, the maximum size that does not degrade SNR excessively.

In the code we obtained with R-Stream™, the inter-tile (y, x) loops are outermost, followed by the p loop and finally the (y, x) intra-tile loops. This loop structure has much better data locality, since each (y, x) sub-grid (corresponding to the intra-tile loops) is scanned entirely for all values of p before the next sub-grid is accessed. R-Stream also obtains (or in this case, preserves) outermost doall parallelism. The Signal-to-Noise Ratio (SNR) of the original, unoptimized SAR program is about 140, and SNRs in the order of 100 are acceptable, according to a Benchmark Suite Manual. Table 1 depicted in FIG. 7 shows the SNRs found as a function of tile sizes. For various ABO implementations, 32×16 is an acceptable tile size, and possibly 32×32 is also an acceptable tile size.

Thus, in some embodiments the tile size can be determined according to the maximum error introduced by the use of an approximation procedure/function. The maximum error can be based on, e.g., the value(s) of one or more function arguments corresponding to the minimum reference, and maximum tile indices. Thus, the minimum and maximum tile indices, i.e., the tile size can be selected such that the maximum error introduced by the approximation is less than a specified threshold value. Alternatively, or in addition, the tile size can be determined according to a weak assumption of smoothness of function arguments. Thus, a tile size is selected such that a variation in one or more function arguments across a tile is less than a threshold percentage (e.g., 1%, 2%, 5%, 10%, 20%, etc.) of respective nominal value(s) of those argument(s). The nominal value(s) may correspond to the initial, final, or middle tile index. In some embodiments, smoothness threshold(s) can be expressed in terms of absolute or total permissible variation(s) in the value(s) of function argument(s). The absolute and/or percentage threshold(s) can be determined via prior simulations and/or may be specified by a programmer.

If a change in the values of one or more parameters of the approximatable function/procedure is related to one or more loop counters and/or one or more tile indices, the change (increment and/or decrement) can be computed using that relation. The tile size can then be selected such that the error introduced by the approximation does not exceed a specified threshold. If the change in the values of one or more parameters of the approximatable function/procedure is constant across iterations, the number of iterations, which generally determines the tile size, can be obtained by dividing a maximum change that does not introduce more than acceptable error in the computations by a change per iteration. Otherwise, heuristics based on statistical values of the difference of arguments for different values of the iterators can be determined, and the number of iterations along each dimension in a tile is determined such that the expected difference does not exceed a specified threshold. If the change varies according to one or more loop counters and/or one or more tile indices, and the compilation system does not have access to the relation describing the variation, the compilation system can use smoothness parameters, which can be provided by a programmer or can be benchmarked by running the program on several (e.g., 5, 10, 20, 40, 100) different examples.

Adaptive ABO

Tile sizes are often a major factor in data locality optimization. While ABO can be applied in programs where the performance is bounded by computations, it is less and less safe to assume that communications can be ignored in terms of their energy consumption. Hence techniques that do not constrain tile sizes as much, while still reducing flop count, are desirable. One direction for finding such approximations is to apply approximations that rely on assumptions on the input data set that are mostly correct. However, in order to guarantee correctness, these approximations may only be applied when the inputs are within a domain in which the approximation error is bound.

To this end, we explore the idea of using approximations that are accurate most of the time. The precision domain $D(_T)$ of an approximation defines the domain of its input parameters for which the approximation error is below a given threshold $_T$. Using an approximation's threshold domain, we can define adaptive approximation functions, for which an approximate but energy-efficient computation is used when the inputs are within $D(_T)$, and a precise but expensive computation is used otherwise. We have used an embodiment of R-Stream™'s RABO optimization to implement and evaluate a series of adaptive RAB Os for the norm and complex exponential parts of SAR. In the case of the norm and complex exponential, the approximation relies on the fact that the values of the norm do not change too abruptly, i.e., the variation is less than 2%, 5%, 10%, etc., from a nominal value.

In some embodiments, a tile size is selected as described above in connection with strict and relaxed ABOs, when adaptive ABO is applied. In mixed adaptive ABO or floating reference point ABO described below, a radius along which the value of the arguments does not vary so as to violate the smoothness constraint is relatively smaller than adaptive and non-adaptive ABOs, As such, the tile size can be chosen independently of the smoothness criterion, and can be selected according to one or more other goals such as optimizing for data locality, parallelism, etc.

Two-Dimensional Norm.

We use the 2-degree approximation of the norm as a function of its x and y variables, written as:

$$\text{norm}(x+\chi, y+\gamma, z) \approx$$

$$f + \frac{x}{f}\chi + \frac{y}{f}\gamma + \frac{-xy}{f^3}\chi\gamma + \left(\frac{1}{2f} - \frac{x^3}{2f^3}\right)\chi^2 + \left(\frac{1}{2f} - \frac{y^2}{2f^3}\right)\gamma^2 \quad (5)$$

The approximation function defined for this function is represented in FIG. 6, and its adaptive version is represented in FIG. 8. The experimental setup includes a fixed tile size of 64×64 in (x, y) and without tiling the t loop. To determine the percentage of operations saved as compared to a non-adaptive version (which always use the approximation but are presumably less precise), we counted the number of times the SAR function needs to use the precise version of the approximatable function. To do so, we counted the number of times the if branch of the code was executed in FIG. 8, as a function of the TAU_2D parameter. While the listing in FIG. 8 uses a single threshold TAU_2D for the function arguments "x" and "y," in general, a different threshold can be applied to each of the function arguments.

The results are presented for the three image sizes in Table 2, shown in FIG. 9. In the image signal, the variations in x, and y are below the TAU_2D threshold for roughly 80 to 90 percent of the samples. The table illustrates a direct relationship among: (i) the size of the precision domain D(T), defined by TAU_2D, (ii) the SNR, which decreases as D(T) increases, and (iii) the percentage of costly, precise computations to be executed, which decreases as D(T) increases. The adaptive ABO can thus enable larger tile sizes while keeping a bounded error. Since the second-degree polynomial approximation has acceptable errors up to 32×16 tile size, higher sizes can result in higher percentages of precise computations in adaptive ABO. This is reflected in Table 3, shown in FIG. 10, in which the SNR and percentage of precise computations is measured for a 1024×1024 image.

In general, ABO may be applied to all loop/tile dimensions or only to a subset thereof. In the foregoing example, the 2-D norm only depends on static values of certain SAR parameters (e.g., fixed platform position, fixed template grid position). Hence, the approximation error may also be independent of any dynamic data for a given grid size and tile size, and we can adjust TAU_2D to match a better trade-off between SNR and ratio of expensive computations. In the last row of Table 3, we measured the percentage of precise computations associated with a TAU_2D threshold value of 8, which brings the SNR down to 103.0 and the percentage of precise computations by 1.4 points only. This is because the difference between the norm and its approximation increases quickly as its input values depart from the precise reference point inputs. Thus, increasing the threshold value TAU_2D from 4 to 8 decreases the SNR significantly (from 138.37 to 103.00) while not achieving a proportional reduction in the number of precise computations that are required (from 36.6% to 35.2%).

Three-Dimensional Norm.

One of the limitations of the 2-D norm as applied to SAR approximation is that it assumes a constant height difference between the platform and the template target grid. In terms of loop transformations, this implies that the p loop cannot be tiled (except in trivial ways that are equivalent to not tiling it). Forming three-dimensional approximation neighborhoods seems profitable if the function is expected to have limited overall variation along the three dimensions. In the case of SAR, the platform moves in space as the p loop is scanned. Hence its distance to the target template grid (the "norm" as we call it here) is expected to have bounded variations within a (p, x, y) neighborhood. As a consequence, the number of points in a 3-D iteration tile for which the norm is close to the reference point's norm is likely to be significantly higher.

Hence, we consider a three-dimensional norm whose evolution is approximated as a degree-2 truncated Taylor series. For any function of three variables, we can derive this from its two-variable version:

$$f(x+\chi, y+\gamma, z+\delta) = \quad (4)$$

$$f + \delta f_z + \frac{\delta^2}{2}f_{zz} + \chi(f_x + f_{xz}) + \gamma(f_y + \delta f_{yz}) + \chi\gamma f_{xy} + \frac{\chi^2}{2}f_{xx} + \frac{\gamma^2}{2}f_{yy}$$

i.e., $$f(x+\chi, y+\gamma, z+\delta) = f + \chi f_x + \gamma f_y + \delta f_z \quad (5)$$
$$+ \chi\delta f_{xz} + \gamma\delta f_{yz} + \chi\gamma f_{xy}$$
$$+ \frac{\chi^2}{2}f_{xx} + \frac{\gamma^2}{2}f_{yy} + \frac{\delta^2}{2}f_{zz}$$

With $f = \text{norm}(x, y, z)$, we have:

$$f(x+\chi, y+\gamma, z+\delta) = f + \frac{\chi x}{f} + \frac{\gamma y}{f} + \frac{\delta z}{f} \quad (6)$$
$$- \frac{\chi\delta xz}{f^3} - \frac{\gamma\delta yz}{f^3} - \frac{\chi\gamma xy}{f^3}$$
$$+ \frac{\chi^2\left(1 - \frac{x^2}{f^2}\right)}{2f} + \frac{\gamma^2\left(1 - \frac{y^2}{f^2}\right)}{2f} + \frac{\delta^2\left(1 - \frac{z^2}{f^2}\right)}{2f}$$

Several computations in Equation (6) can be factored out. In the context of RABO, variables x, y and z are also constant within a tile, as well as $f$. GCM factors the sub-expressions in (6) that depend only on x, y and z (such as z/f, for instance) out of the tile. GCM, a popular SSA-based optimization, is available in many modern compilers, including R-Stream.

A high number of non-hoistable operations remain, however, within the tiles: 13 multiplications, 6 additions and 6 subtractions. The main cause for this high number of operations is a three parameter, three-dimensional norm. Performance measurements presented below show that this approximation is not competitive with precise computations. Therefore, we explore the approximation of an expensive sub-expression of the norm computation that only has one parameter (namely, square root), whose approximation has hence significantly more competitive computational cost.

Square Root.

In order to reduce the computational complexity of the approximation, especially for three-dimensional norms, we used a development into Taylor series of the square root function, truncated at degree 2, represented as:

$$(x+\chi)^{\frac{1}{2}} \approx x^{\frac{1}{2}} + \frac{\chi}{2x^{\frac{1}{2}}}\left(1 - \frac{\chi}{4x}\right) \quad (7)$$

Combined with the $x^2+y^2+z^2$ argument, each approximate computation costs 3 multiplications, one addition and two subtractions. The common factor 2/x can be hoisted outside the tiled loops using GCM, amortizing its cost over the tile that uses it. The code of the adaptive square root according to one embodiment is shown in FIG. 11. A precise square root computation is triggered when the argument varies by more than TAU_S2 from the argument to the reference point. The frequency at which a precise square root computation is required, as a function of tile sizes and TAU_S2, is represented in Table 4, depicted in FIG. 12.

Sine and Cosine.

There are two expensive parts of the computation of sine and cosine: the reduction of the argument to a small interval (typically $[-\pi,\pi]$ or $[0, 2\pi]$) and the computation of the sine and cosine of the reduced argument. Argument reduction boils down to a division remainder operation. There is an opportunity for turning the remainder operation into a few inexpensive operations (tests and additions) when the argument only varies by a limited amount. For instance, if the argument variation is within $[0, 2\pi]$, no reduction is needed and we can obtain the next sine and cosines using the well-known identities (8) and (9), in which $\sin(x)$ and $\cos(x)$ are already computed (they are the arguments of the reference point), and $\chi$ is the difference between the reference point x and the neighboring point considered for approximation. In this case, $\sin(\chi)$ and $\cos(\chi)$ do not require argument reduction.

$$\sin(x+\chi)=\sin(x)\cos(\chi)+\cos(x)\sin(\chi) \qquad (8)$$

$$\cos(x+\chi)=\cos(x)\cos(\chi)-\sin(x)\sin(\chi) \qquad (9)$$

Sine and cosine computations are often computed in one function in order to factor out the argument reduction. We also boil down the bulk of the argument reduction to a floor operation by scaling the sine/cosine argument. We do this by dividing the constant multiplier by $2\pi$ and calling $\sin(2\pi x)$ instead of $\sin(x)$. Hence the argument is brought to $[0, 2\pi)$ by looking at $x-[x]$. Another energy-expensive part of the sine and cosine computations is the evaluation of the sine and cosine within the reduced interval. We used convex programming to compute polynomials of degrees 4 to 6 that minimize the maximum absolute error with $\sin(x)$ over $[0, \pi/2]$.

There are two major differences between the polynomial approximation of sine and cosine and the ones we considered for the norm. First, the domain of the polynomial approximation is bounded (to $[-\pi, \pi]$), which makes it possible to guarantee a maximum absolute approximation error. The second one is that, since derivatives of sine and cosine are themselves sines and cosines, there is no computational advantage in formulating the polynomial approximation of $\sin(x+\chi)$ as a function of $\sin(x)$. As a result, while polynomial approximations are more efficient than precise computations, strictly speaking only the reduction operation is subject to a strength reduction leveraging the knowledge of a reference point's sine or cosine.

In Table 5 depicted in FIG. 13, we show the percentage of precise computations executed by the adaptive sine-cosine combined function represented in FIG. 14, as a function of the tile size. The adaptive function avoids the use of argument reduction when the argument is in $[-2\pi, 2\pi]$. The percentage of costly reductions is low, considering that the multiplicative factor in the argument of the sincos call is large (about 67). This is however consistent with the results we found in the previous section about the density of precise norm computations, which reflect smoothness of the inputs. As mentioned earlier, the fact that we are applying the approximation within a three-dimensional neighborhood is certainly a major factor in this result.

Floating Reference Point

The adaptive RABO approximation method that we have considered is much more robust to tile size changes. However, it is still dependent upon tile sizes, because in a tile only one chosen particular point (also called a reference point) is selected for which the exact function is implemented. In some embodiments, the single reference point is the middle point of the tile while in other embodiments the single reference point is the first point in the tile.

The optimization can be made generally independent of the tile sizes by supporting a "floating reference point." Thus, in some embodiments, the reference point for each tile can be updated when the input data exits the precision domain associated with the current reference point. This technique may be advantageous when the input is partitioned into smooth parts. However, the potential update of the reference point is a reduction operation, which modifies the way parallelization must be performed, and usually the performance of the resulting parallel program.

Results

We pointed out previously that ad hoc ABO significantly restricts the space of program optimization (in particular, scheduling and tiling). Various embodiments described herein enable a way of relaxing the trade-off constraints among the goals of increasing the efficiency of computations, improving data locality (and reduce communications), and perform precise computations. This can be important to any data processing system in general, and in particular, in the context of embedded hardware, whose autonomy is defined by how much can be done with a fixed amount of energy.

As described above, in various embodiments, under a weak assumption of smoothness of the input data, we can apply an optimization that we called Adaptive ABO (AABO) can replace a significant number of (e.g., 5%, 10%, 20%, etc.) expensive computations with cheap ones, i.e., requiring fewer and/or simpler computations. Various embodiments of AABO can shift the trade-off from being between tile sizes and precision, to being among tile sizes, expected percentage of (precise) costly operations, and precision. Thus, various embodiments of AABO allow for tiling loop iterations along more dimensions, which can decrease the percentage of expensive computations, and can simultaneously allow for locality optimizations and parallelization of the program using more than one CPUs/processor cores.

The experiments were performed using Intel Haswell PERFECT (Power Efficiency Revolution for Embedded Computing Technologies) baseline system, and using the Synthetic Aperture Radar (SAR) kernels and input data sets from the PERFECT benchmark suite. Haswell is Intel's x86 family processor, which features advanced power management such as (hardware-driven) clock gating. Hardware event counters, including counters for floating point operations are not available in Haswell. As a result, since SAR is computation-bound, we measure wall clock execution time (i.e., actual execution time in seconds, or fractions thereof) and to count the number of retired floating-point operations (flops). Assuming that the number of floating-point operations executed by the same program with the same input data is constant across Ivy Bridge and Haswell architectures, we counted the number of retired floating point operations on the Ivy Bridge machine (for the same number of threads).

Figures 15, 16:
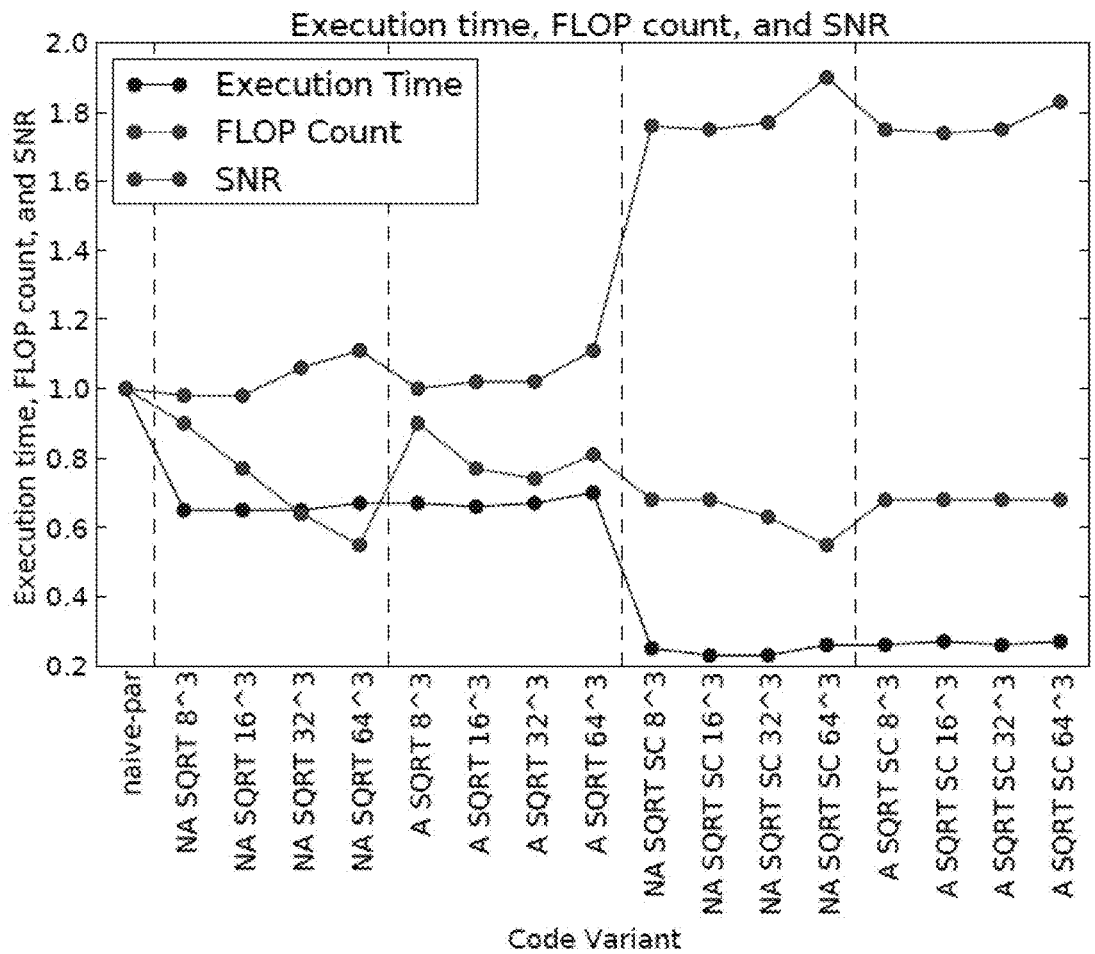
FIG. 15 depicts performance parameters of different compute-bound functions, according to various embodiments.
FIG. 16 shows a table illustrating a relationship between the SNR and a threshold used in adaptive ABO, according to various embodiments.

We measured execution time and flop count for SAR, in which an embodiment of RABO was applied to the norm or to the square root, and/or to the sine and cosine computations. FIG. 15 represents these counts for different combinations and varying tile sizes, normalized to the naive parallel implementation. All these versions were automatically generated by an embodiment of R-Stream™. The approximation functions were defined by us in the source code and designated as approximations using pragma. Resulting SNR is also represented and normalized to the reference value.

There are five groups of experiments, within which tile sizes were varied from 8×8×8 to 64×64×64. Groups of experiments are separated by vertical dashed lines in FIG. 15. They are presented from left to right in the following order: (i) Naively parallelized reference code; (ii) RABO of the norm calculation using the non-adaptive square root computation described above; (iii) RABO of the norm calculation using the adaptive version of the square root computation; (iv) RABO of both non-adaptive square root and sine (and cosine) described above; and (v) RABO of both adaptive square root and sine.

We made a few observations, as follows: (1) The versions parallelized by R-Stream are all faster than the naive parallelization. This is likely due to an increase in data locality, since the inner loops perform all the computations on a portion of the image before processing the next portion. (2) RABO of sine has the most dramatic impact on execution time. However, the resulting number of flops as given by hardware event couters raises just as dramatically. The reason for this increase in flop count is that, although the GLibC implementation of sincos has a higher number of multiplications and additions, it is also highly SIMDized. Our version is a straightforward, unoptimized implementation, which does not get SIMDized by GCC. The lower flop count in the original sincos is likely due to the fact that SIMD instructions are counted as one operation. If the flop counts in the SIMDized instructions is scaled by the number of data processed by the instruction, the total number of flops using RABO would be less than that corresponding to the GLibC implementation. (3) Adaptive and non-adaptive square root RABO computations have comparable execution times, but the adaptive version is more robust to the errors appearing as the tile sizes increase. In fact, adaptive square root keeps the SNR at an acceptable level for a very small performance penalty, in terms of increased number of flops and/or execution time.

While the threshold values in the precision domain of approximated functions are a variable that the programmer can use to trade-off expensive computations for accuracy, other variables can have a considerable influence on this trade-off. When using polynomial approximations, the degree of the polynomial is another trade-off variable. We illustrate this by showing in Table 6 depicted in FIG. 16 the effect of modifying both the TAU_2D threshold and the degree of the sine polynomial approximation on the SNR in a version that uses both adaptive 2-D norm and sincos approximations. The influence of the 2-D norm threshold parameter is negligible as compared to the degree of the sine approximation, up to TAU_2D=4.0, where the influence of TAU_2D becomes measurable.

For data processor architectures that include reconfigurable fabric (i.e., reconfigurable computation and/or routing circuitry), an adaptive data path can be readily synthesized in place of the non-adaptive one. As such, embodiments of AABO can yield significant benefits in terms of performance without substantially affecting computation accuracy. Data processor architectures featuring SIMD engines may not be optimally suited for the adaptive implementations in part because. SIMDization is generally harder to perform on adaptive approximations because the events of a precise and expensive computation are sparse. In some embodiments of a compiler system described herein, partial sparse codes can be SIMDized by delaying the execution of expensive operations until there are enough of them. Thus, various embodiments can enhance performance in terms of speed of execution, number of operations, and/or power/energy consumption, in both non-vectored and vectored (i.e. highly parallelizable) data processing systems.

Some embodiments described herein allow for reducing the computational intensity of numerical library functions when part of the input is constant, by using the approximation of the evolution of the library function value in the neighborhood of a reference point. Some embodiments feature a more generally applicable transformation, which does not require constant input values. Some embodiments relax restrictions on the loop transformation. These loop transformation constraints come from the fact that the decomposition of the problem into neighborhoods in which approximations are valid translate into loop tiling. Therefore, in some embodiments that are not adaptive, tile size is selected according to an error introduced by the approximation and/or according to a variation in the values of one or more function arguments across the tile. In some embodiments, tile size is selected independently of the function arguments, and the exact function or the approximation thereof are selected dynamically according to the values of one or more function arguments. A reference value used by an approximation may also be adjusted within a tile.

This type of approximation is generally applicable under the assumption that the input values are smooth enough, i.e., variation in values of function argument(s) is not more than 2%, 5%, 10%, etc. of corresponding reference values. Various embodiments facilitated use of approximations in up to 90% of the expensive computations, and up to two thirds when large tile sizes are applied, depending upon the approximation function's sensitivity to input and the tile sizes (neighborhood size). As a result, the compiler has flexibility to optimize tile sizes for data locality and communication minimization while decreasing number of operations, energy/power consumption, and/or execution time without introducing substantial computation error. As such, the various embodiments described herein can be used as a tool in many applications, e.g., radar design (for implementation of SAR computational kernels for Air Wide Area Surveillance Processing (Air WASP)).

Several PERFECT architectures include processors that exploit accuracy tradeoffs to reduce power. Several industry processor vendors have developed and are expected to develop such data processing systems (e.g., those that include variable precision floating point units), as well. Architectures such Anton can exploit accuracy in the innermost loops of the executed programs to achieve massive performance increases. Various ABO embodiments described herein can be used to achieve computation accuracy-performance tradeoffs in systems that provide advanced hardware features and also in those that do not include advanced hardware features. They can create the opportunity to avoid expensive function evaluations by replacing those evaluations with approximations.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms.

Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, we claim:

1. A method for optimizing performance of a processing system, the method comprising:
   tiling by a compilation processor a loop nest comprising at least one loop, each tile comprising a specified computation based on an argument, the argument specifying an input used by the computation, a value of the argument varying according to a tile index, a tile size being selected such that a difference between a value of the argument corresponding to a final tile index and a value of the argument corresponding to an initial tile index is at most equal to a threshold;
   employing by the compilation processor an exact procedure, to be executed by a target processor, implementing the specified computation for the initial tile index;
   employing by the compilation processor an approximate procedure, to be executed by the target processor, implementing the specified computation for each subsequent tile index, wherein a computation cost according to a cost metric of the approximate procedure is less than a computation cost according to that cost metric of the exact procedure, thereby improving execution of the loop nest by minimizing cost of executing the loop nest by the target processor.

2. The method of claim 1, wherein:
the specified computation is based on a first plurality of arguments comprising a second plurality of arguments, respective values of the second plurality of arguments varying according to the tile index; and
the tile size is selected such that respective differences between respective values of the second plurality of arguments corresponding to the final tile index and respective values of the second plurality of argument corresponding to the initial tile index are at most equal to respective thresholds.

3. The method of claim 1, wherein the threshold is based on, at least in part, an error associated with the approximate procedure.

4. The method of claim 1, wherein the cost metric comprises at least one of a number of computations and a type of a computation.

5. The method of claim 1, wherein:
an approximate result is computed for a first subsequent index is based on, in part, an exact result obtained from the exact procedure; and
respective approximate results computed for other subsequent indices are based on, in part, respective approximate results obtained from the approximate procedure for respective previous indices.

6. The method of claim 1, wherein each approximate result computed for each one of the subsequent indices is based on, in part, an exact result obtained from the exact procedure.

7. The method of claim 6, further comprising parallelizing the tiled loop nest.

8. The method of claim 1, wherein:
for each one of a first plurality of subsequent indices a corresponding approximate result is computed based on, in part, an exact result obtained from the exact procedure; and
for each one of a second plurality of subsequent indices a corresponding approximate result is computed based on, in part, an approximate result corresponding to a respective tile index from the first plurality of subsequent indices.

9. The method of claim 8, further comprising parallelizing computation of approximate results corresponding to the first plurality of indices.

10. A method for optimizing performance of a processing system, the method comprising:
in a tiled a loop nest comprising at least one loop, each tile comprising a specified computation based on a first argument, the first argument specifying a first input used by the computation, a value of the first argument varying according to a tile index:
employing by a compilation processor an exact procedure, to be executed by a target processor, implementing the specified computation for a reference tile index;
determining if a first difference between values of the first argument corresponding to a first non-reference tile index and corresponding to the reference index is greater than a first threshold;
if the first difference is not greater than the first threshold, employing by the compilation processor an approximate procedure, to be executed by the target processor, implementing the specified computation for the first non-reference tile index, wherein a computation cost according to a cost metric of the approximate procedure is less than a computation cost according to that cost metric of the exact procedure; and
otherwise, employing the exact procedure for the first non-reference tile index,
wherein employing of the approximate procedure improves execution of the loop nest by minimizing cost of executing the loop nest by the target processor.

11. The method of claim 10, wherein the approximate procedure depends, in part, on the determined first difference between values of the first argument corresponding to the first non-reference tile index and corresponding to the reference index.

12. The method of claim 10, wherein the specified computation is further based on a second argument, the second argument specifying a second input used by the computation, a value of the second argument also varying according to the tile index, the method further comprising:
determining if a second difference between values of the second argument corresponding to the first non-reference tile index and corresponding to the reference index is greater than a second threshold;
if both the first and second differences are not greater than the first and second thresholds, respectively, employing the approximate procedure for the first non-reference tile index; and
otherwise, employing the exact procedure for the first non-reference tile index.

13. The method of claim 12, wherein the second threshold is equal to the first threshold.

14. The method of claim 10, wherein the first threshold is based on, at least in part, an error associated with the approximate procedure.

15. The method of claim 10, wherein the cost metric comprises at least one of a number of computations and a type of a computation.

16. The method of claim 10, further comprising modifying the reference index by setting the first non-reference tile index as the reference index, if the exact procedure is employed for the first non-reference tile index.

17. The method of claim 10, further comprising employing the approximate procedure implementing the specified computation for a second non-reference tile index, wherein the approximate procedure depends on, in part, one of: (i) an exact result obtained from the exact procedure, and (ii) an approximate result obtained from the approximate procedure employed for the first non-reference tile index.

18. The method of claim 17, further comprising employing the approximate procedure implementing the specified computation for a third non-reference tile index, wherein the approximate procedure depends on, in part, one of: (i) an exact result obtained from the exact procedure, and (ii) an approximate result obtained from the approximate procedure employed for the second non-reference tile index.

19. The method of claim 10, further comprising tiling a loop nest to generate the tiled loop nest, a tile size being selected such that a difference between a value of the argument corresponding to a final tile index and a value of the argument corresponding to an initial tile index is at most equal to a threshold.

20. The method of claim 10, further comprising parallelizing the tiled loop nest.

21. A compilation system for optimizing performance of a processing system, the compilation system comprising:
a first processor; and
a first memory in electrical communication with the first processor, the first memory comprising instructions which, when executed by a processing unit comprising at least one of the first processor and a second processor, and in electronic communication with a memory module comprising at least one of the first memory and a second memory, program the processing unit to:

tile a loop nest comprising at least one loop, each tile comprising a specified computation based on an argument, the argument specifying an input used by the computation, a value of the argument varying according to a tile index, a tile size being selected such that a difference between a value of the argument corresponding to a final tile index and a value of the argument corresponding to an initial tile index is at most equal to a threshold;

employ an exact procedure implementing the specified computation for the initial tile index;

employ an approximate procedure implementing the specified computation for each subsequent tile index, wherein a computation cost according to a cost metric of the approximate procedure is less than a computation cost according to that cost metric of the exact procedure.

22. The compilation system of claim 21, wherein:

the specified computation is based on a first plurality of arguments comprising a second plurality of arguments, respective values of the second plurality of arguments varying according to the tile index; and the tile size is selected such that respective differences between respective values of the second plurality of arguments corresponding to the final tile index and respective values of the second plurality of argument corresponding to the initial tile index are at most equal to respective thresholds.

23. The compilation system of claim 21, wherein the threshold is based on, at least in part, an error associated with the approximate procedure.

24. The compilation system of claim 21, wherein the cost metric comprises at least one of a number of computations and a type of a computation.

25. The compilation system of claim 21, wherein:

an approximate result is computed for a first subsequent index is based on, in part, an exact result obtained from the exact procedure; and respective approximate results computed for other subsequent indices are based on, in part, respective approximate results obtained from the approximate procedure for respective previous indices.

26. The compilation system of claim 21, wherein each approximate result computed for each one of the subsequent indices is based on, in part, an exact result obtained from the exact procedure.

27. The compilation system of claim 26, where in the processing unit is further programmed to parallelize the tiled loop nest.

28. The compilation system of claim 21, wherein:

for each one of a first plurality of subsequent indices a corresponding approximate result is computed based on, in part, an exact result obtained from the exact procedure; and for each one of a second plurality of subsequent indices a corresponding approximate result is computed based on, in part, an approximate result corresponding to a respective tile index from the first plurality of subsequent indices.

29. The compilation system of claim 28, wherein the processing unit is further programmed to parallelize computation of approximate results corresponding to the first plurality of indices.

30. A compilation system for optimizing performance of a processing system, the compilation system comprising:

a first processor; and a first memory in electrical communication with the first processor, the first memory comprising instructions which, when executed by a processing unit comprising at least one of the first processor and a second processor, and in electronic communication with a memory module comprising at least one of the first memory and a second memory, program the processing unit to:

employ, in a tiled a loop nest comprising at least one loop, each tile comprising a specified computation based on a first argument, the first argument specifying a first input used by the computation, a value of the first argument varying according to a tile index, an exact procedure implementing the specified computation for a reference tile index;

determine if a first difference between values of the first argument corresponding to first non-reference tile index and corresponding to the reference index is greater than a first threshold;

if the first difference is not greater than the first threshold, employ an approximate procedure implementing the specified computation for the first non-reference tile index, wherein a computation cost according to a cost metric of the approximate procedure is less than a computation cost according to that cost metric of the exact procedure; and otherwise, employ the exact procedure for the first non-reference tile index.

31. The compilation system of claim 30, wherein the approximate procedure depends, in part, on the determined first difference between values of the first argument corresponding to the first non-reference tile index and corresponding to the reference index.

32. The compilation system of claim 30, wherein:

the specified computation is further based on a second argument, the second argument specifying a second input used by the computation, a value of the second argument also varying according to the tile index; and the processing unit is further programmed to:

determine if a second difference between values of the second argument corresponding to first non-reference tile index and corresponding to the reference index is greater than a second threshold;

if both the first and second differences are not greater than the first and second thresholds, respectively, employ the approximate procedure for the first non-reference tile index; and otherwise, employ the exact procedure for the first non-reference tile index.

33. The compilation system of claim 32, wherein the second threshold is equal to the first threshold.

34. The compilation system of claim 30, wherein the first threshold is based on, at least in part, an error associated with the approximate procedure.

35. The compilation system of claim 30, wherein the cost metric comprises at least one of a number of computations and a type of a computation.

36. The compilation system of claim 30, wherein the processing unit is further programmed to modify the reference index by setting the first non-reference tile index as the reference index, if the exact procedure is employed for the first non-reference tile index.

37. The compilation system of claim 30, wherein the processing unit is further programmed to employ the approximate procedure implementing the specified computation for a second non-reference tile index, wherein the approximate procedure depends on, in part, one of: (i) an exact result obtained from the exact procedure, and (ii) an approximate result obtained from the approximate procedure employed for the first non-reference tile index.

38. The compilation system of claim 37, wherein the processing unit is further programmed to employ the approximate procedure implementing the specified computation for a third non-reference tile index, wherein the approximate procedure depends on, in part, one of: (i) an exact result obtained from the exact procedure, and (ii) an approximate result obtained from the approximate procedure employed for the second non-reference tile index.

39. The compilation system of claim 30, wherein the processing unit is further programmed to tile a loop nest to generate the tiled loop nest, a tile size being selected such that a difference between a value of the argument corresponding to a final tile index and a value of the argument corresponding to an initial tile index is at most equal to a threshold.

40. The compilation system of claim 30, wherein the processing unit is further programmed to parallelize the tiled loop nest.

* * * * *

UNITED STATES PATENT AND TRADEMARK OFFICE
CERTIFICATE OF CORRECTION

| | | |
|---|---|---|
| PATENT NO. | : 10,209,971 B2 | Page 1 of 1 |
| APPLICATION NO. | : 14/699854 | |
| DATED | : February 19, 2019 | |
| INVENTOR(S) | : Muthu M. Baskaran et al. | |

It is certified that error appears in the above-identified patent and that said Letters Patent is hereby corrected as shown below:

In the Specification

At Column 1, Line 14, insert:
-- STATEMENT OF GOVERNMENT SUPPORT
This invention was made with government support under Contract No. HR0011-12-C-0123 awarded by the Defense Advanced Research Projects Agency (DARPA). The government has certain rights in the invention. --

Signed and Sealed this
Second Day of August, 2022

Katherine Kelly Vidal
*Director of the United States Patent and Trademark Office*